March 10, 1925.

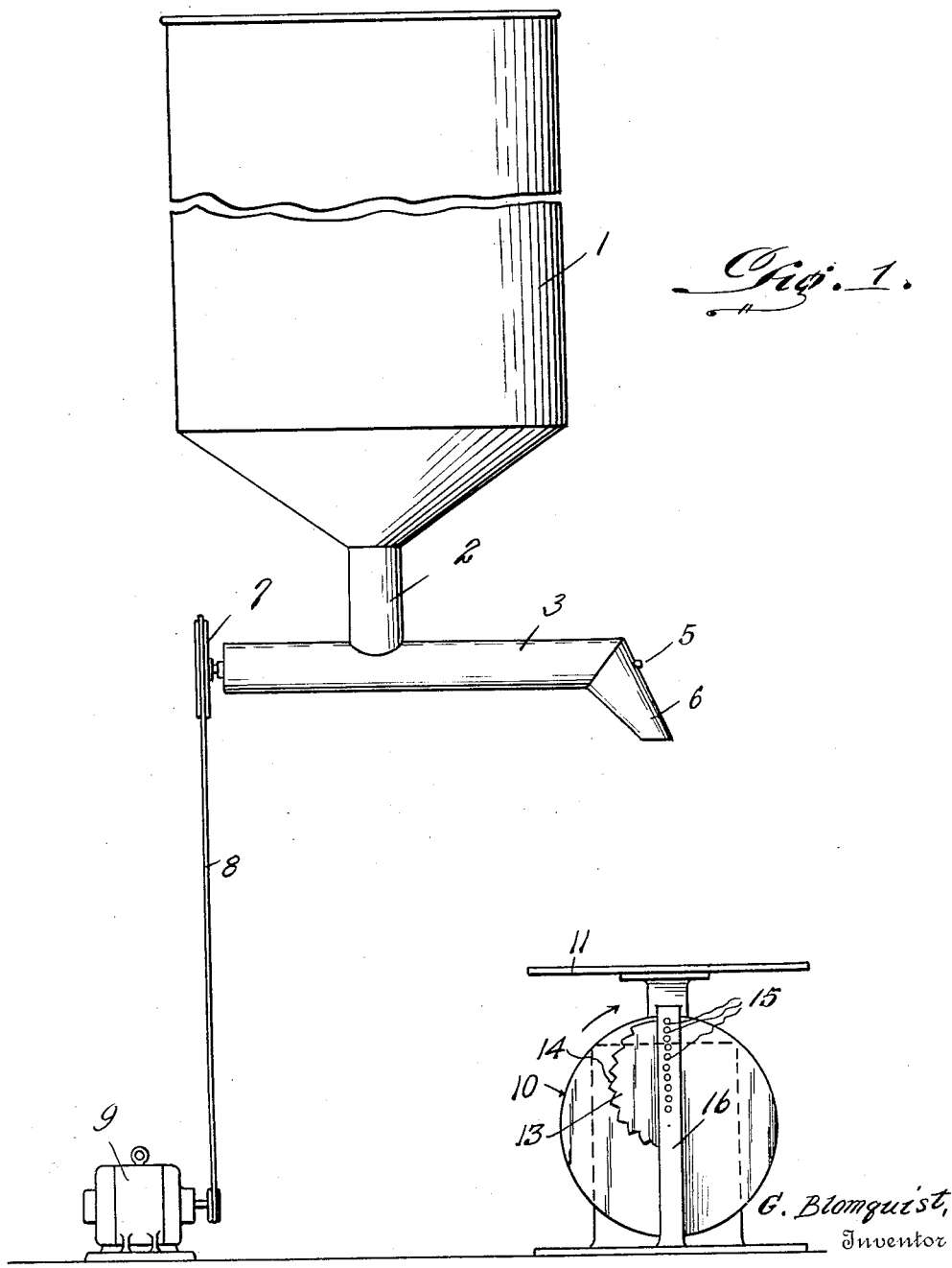

G. BLOMQUIST

AUTOMATIC WEIGHER 1,529,155

Filed May 15, 1923

G. Blomquist,
Inventor

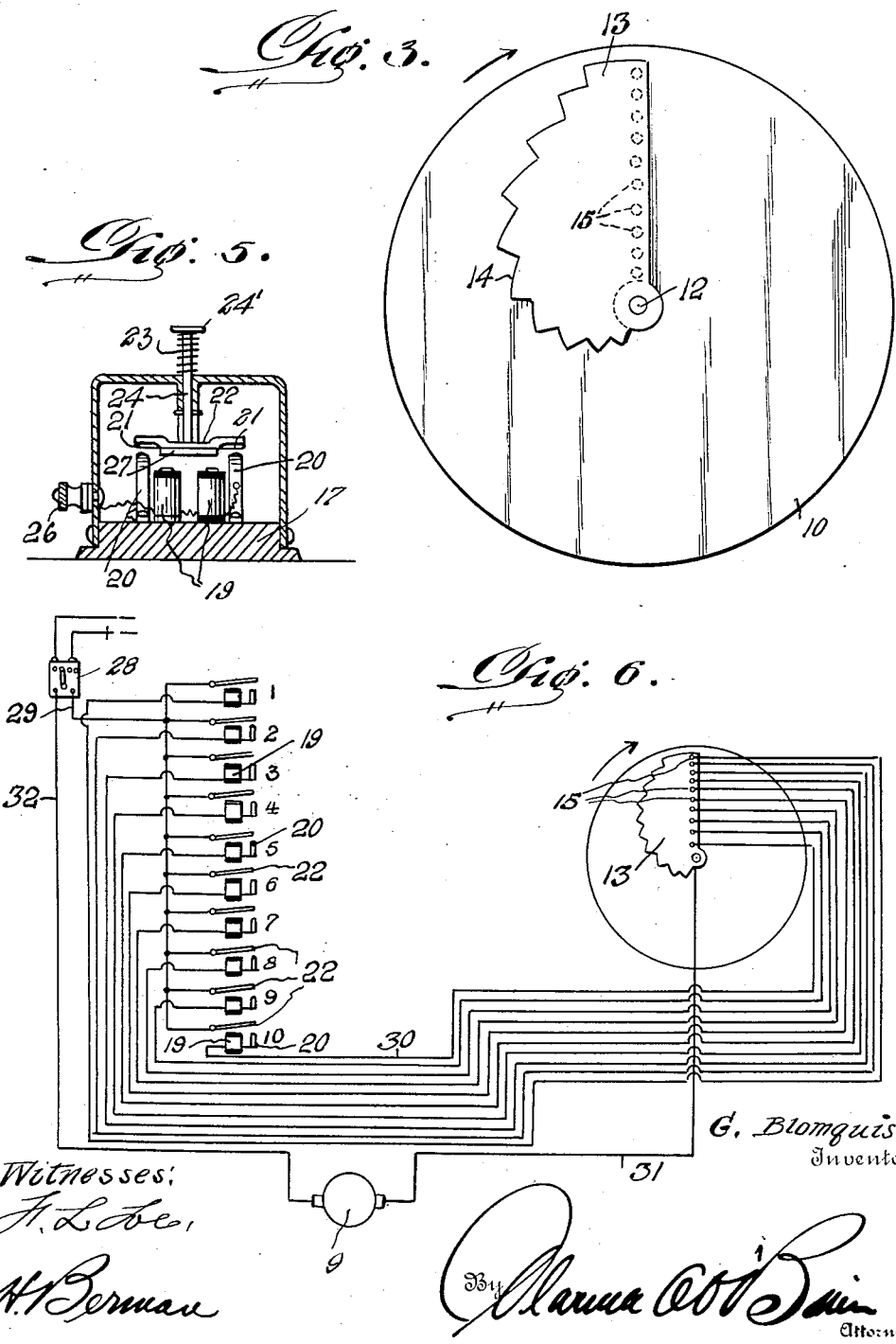

Patented Mar. 10, 1925.

1,529,155

UNITED STATES PATENT OFFICE.

GUNNARD BLOMQUIST, OF TURLOCK, CALIFORNIA.

AUTOMATIC WEIGHER.

Application filed May 15, 1923. Serial No. 639,070.

*To all whom it may concern:*

Be it known that GUNNARD BLOMQUIST, a citizen of the United States, residing at Turlock, in the county of Stanislaus and State of California, has invented certain new and useful Improvements in Automatic Weighers, of which the following is a specification.

This invention relates to automatic weighers of the type adapted to weigh a predetermined amount of material being fed from the hopper.

An object of the invention is to provide a device of this character having a hopper for containing a quantity of material provided with means for feeding said material therefrom to a weighing device adapted to receive a receptacle to receive the material being fed from the hopper, means being provided for operating the feeding means which is automatically stopped when a predetermined amount of material is delivered to the container.

Another object of the invention is to provide a weighing mechanism associated with a feeding mechanism for feeding material from the hopper with manual means for setting said feeding mechanism in operation to feed material from the hopper to the weighing mechanism, and means operated by the weighing mechanism for stopping the operation of the feeding mechanism when a predetermined amount of material has been delivered from the hopper to said weighing mechanism.

The invention further includes improvements in the details of construction and arrangement of parts which are particularly pointed out in the following description and claims, and shown in the accompanying drawings, in which:

Figure 1 is a view in elevation of a hopper with a means for feeding material therefrom together with a weighing mechanism for receiving material fed from the hopper.

Figure 2 is a sectional view through the hopper and feeding mechanism.

Figure 5 is a sectional view taken on the line 5—5 of Figure 4.

Figure 6 is a wiring diagram showing the electrical connections between the several parts.

Figure 3:
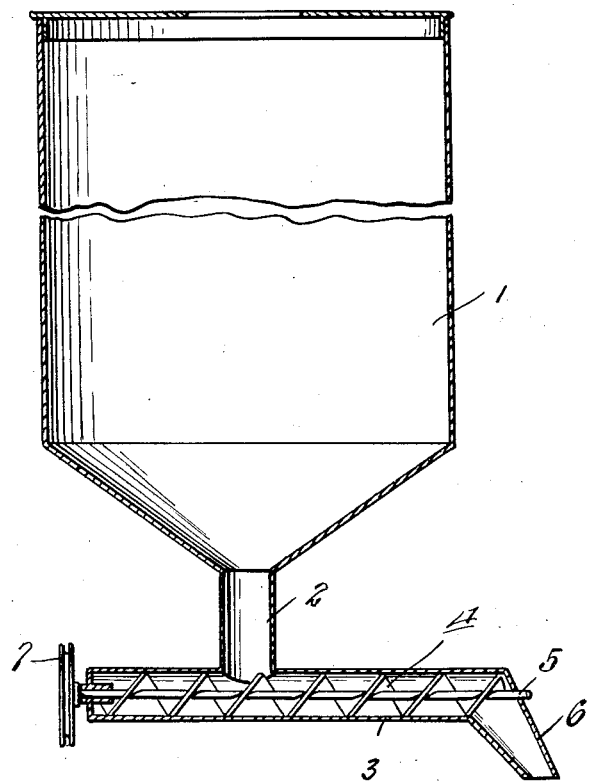
Figure 3 is a detail view showing the contact plate carried by the weighing mechanism adapted to stop the operation of the feeding mechanism when a predetermined weight on the scales has been reached.

1 indicates a hopper for containing a quantity of dry powdered or granular material having an outlet pipe 2 in the bottom thereof communicating with a casing 3 extending transversely under said hopper in which is mounted a spiral seating member 4 on a shaft 5 rotatably mounted in the casing 3 and adapted to feed the material from the outlet 2 through the spout 6 on the end of the casing. One end of the shaft is provided at 7 beyond the ends of the tubular casing 3 with a pulley for receiving a belt 8 adapted to be passed over the driving pulley of an electric motor 9, which rotates the spiral feed screw 4 for feeding the material from the hopper out of the outlet 6.

A weighing mechanism 10 of any desired form is provided with a weighing platform 11 positioned under the end of the spout 6, and adapted to receive a sack or other receptacle for receiving material fed from the hopper 2 and discharged out of the spout 6 to be weighed by said weighing mechanism in the usual manner. In place of the usual indicating hand and dial on the weighing mechanism for indicating the weight of the material contained on the weighing platform, the rotary shaft 12 which usually carries the indicating hand is provided with a plate 13 having one edge formed with a plurality of concentric portions arranged in stepped relation as indicated at 14 for cooperation with a plurality of contacts 15 carried by an upright arm 16 mounted on the base of the weighing mechanism 10.

A contact mechanism is mounted on a base 17 and is enclosed by a casing 18 which includes a plurality of pairs of electromagnets 19 mounted on said base at the sides of which are arranged contacts 20 adapted for cooperation with the contacts 21, carried by the movable member 22 normally held in raised position as indicated in Figure 5 by a spring 23 encircling the rod 24 extending upwardly through the casing 18 and slidable therein and provided at its upper end with a head 24'. Each pair of electromagnets 19 are connected in series with their corresponding contacts 20, one contact of each of the series being connected to a common circuit within the casing terminating at the binding post 25. The opposite end of the circuit through each pair of electromagnets is connected to one of a plurality of binding posts 26, there being a sufficient number of binding posts to correspond with the number of pairs of electromagnets 19. The heads 24' serve as finger buttons so that the member 22 may be depressed to bring the contacts 21 into cooperation with the contacts 20 for closing the circuit through the electromagnet as will be presently described, after which the electromagnets will hold said armature closed thru energization and magnetic action on the armature 27, until the remote means breaks the circuit through these magnets.

Figure 4:
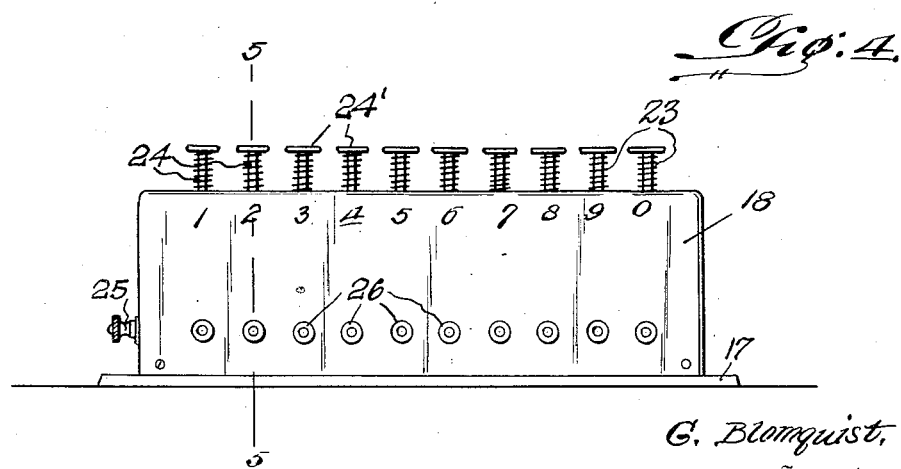
Figure 4 is a side elevation of a contact mechanism for setting the feeding mechanism into operation to feed any one of predetermined amounts of material to the weighing mechanism.

Referring to Figure 6, illustrating the wiring connection between the several parts above described, it will be noted that the common terminal 25 is connected to one side of a circuit from a source of power through the transformer 28 by the wire 29. Each of the contacts 26 is connected through a separate wire indicated at 30 with one of the contacts 15 in the post 16 of the weighing mechanism. A connection 31 from the plate 13 is connected to one terminal of the motor 9, the other terminal of which is connected to the opposite side of the line through the wire 32 forming a complete circuit through the several parts of the machine. When it is desired to weigh a predetermined quantity of material on the weighing mechanism, say, five pounds, a receptacle of any desired form, such as a sack is placed on the weighing platform 11 of the weighing mechanism, after which the head 24 of the contact mechanism opposite the numeral 5 on the outside of the casing 18 as shown in Figure 4 is depressed for closing the circuit through its corresponding pair of electromagnets 19 which closes the circuit through the weighing mechanism and the motor, which is held closed by the electromagnet in an obvious manner. This starts the motor 9 in operation, which through the belt connection 8 will rotate the feed screw 4 and feed material from the hopper 1 through the casing 3 and discharge it out of the spout 6 into the receptacle on the weighing platform. The stem 12 of the weighing mechanism will be rotated as the weight of the material in the sack increases and will correspondingly move the plate 13 carried thereby under the contacts 15 in the direction of the arrow shown in Figure 3 until the stepped portion under the contact 15 connected with the particular pair of electromagnets energized moves beyond said contacts which will break the circuit through the motor, deenergize the electromagnet 19 and permit the particular member 22 to return to its normal position under the action of the spring 23, the sack or container having received five pounds of material in this operation, the weighing mechanism in the plate 13 returning to its normal position as shown in Figures 1 and 3 as soon as the container with the material in it is removed from the weighing platform ready for a subsequent operation to weigh another amount of material.

In the machine shown there is provision made for weighing amounts of material ranging in weight from one to ten pounds, the plates 13 being formed with a corresponding number of stepped portions so as to break the contact with the corresponding contact 15 at the proper time for any one of these weights of material, indicia being placed on the sides of the casing 18 for indicating the proper heads to operate for a determined amount of material.

What I claim as new is:

1. An automatic weighing apparatus comprising a material feeder, an electric motor operatively connected with the feeder, a weighing scale arranged to receive material from the feeder, a rotary indicator shaft journaled for rotation upon the scale, a circuit closing plate mounted upon said shaft, a plurality of stationary contacts with which said plate is normally in engagement, said plate being fashioned to successively disengage the contacts during its movement through a predetermined arcuate path, a plurality of electric circuits in which said motor, plate, and stationary contacts are included, separate switches for selectively closing said circuits, and a magnet connected in each circuit for maintaining the coacting switch closed for a predetermined period.

2. In an automatic weighing device of the class described, a weighing scale including a rotary indicator shaft and a depressible platform for rotating said shaft, a substantially semi-circular electric circuit closing plate fixed to said shaft for rotation therewith, the periphery of said plate being notched, an arm disposed in proximity to said plate, and a plurality of stationary contacts carried by said arm and disposed relative to each other to come within an arcuate path traversed by the notched edge of said plate, whereby to be successively disengaged from said edge.

In testimony whereof I affix my signature.

GUNNARD BLOMQUIST.